US006264225B1

(12) United States Patent
Kunishige et al.

(10) Patent No.: US 6,264,225 B1
(45) Date of Patent: Jul. 24, 2001

(54) ADJUSTABLE SIDE FRAME AND WHEELCHAIR WITH ADJUSTABLE SIDE FRAME

(75) Inventors: Wayne M. Kunishige, Longmont; Murray G. Slagerman, Lafayette, both of CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 09/333,084

(22) Filed: Jun. 14, 1999

(51) Int. Cl.[7] .......... B62M 1/14

(52) U.S. Cl. .......... 280/250.1; 280/304.1; 280/650; 280/657

(58) Field of Search .......... 280/250.1, 304.1, 280/650, 657, 47.4, 47.41; 297/325, 344.1, 344.12, 344.13, 344.14

(56) References Cited

U.S. PATENT DOCUMENTS

| | | | |
|---|---|---|---|
| 4,165,127 * | 8/1979 | Vago | 297/345 |
| 4,966,379 | 10/1990 | Mulholland | 280/242.1 |
| 5,020,816 | 6/1991 | Mulholland | 280/250.1 |
| 5,267,745 | 12/1993 | Robertson et al. | 280/250.1 |
| 5,320,373 * | 6/1994 | Robertson et al. | 280/250.1 |
| 5,409,247 * | 4/1995 | Robertson | 280/250.1 |
| 5,480,172 | 1/1996 | James . | |
| 5,590,893 | 1/1997 | Robinson et al. | 280/250.1 |
| 5,593,173 | 1/1997 | Williamson | 280/642 |
| 5,727,809 * | 3/1998 | Ordelman et al. | 280/650 |

FOREIGN PATENT DOCUMENTS

| | | |
|---|---|---|
| 2 747 305 | 10/1997 | (FR) . |
| WO 93/08782 | 5/1993 | (WO) . |

* cited by examiner

*Primary Examiner*—Anne Marie Boehler
(74) *Attorney, Agent, or Firm*—MacMillan, Sobanski & Todd, LLC

(57) ABSTRACT

An adjustable side frame for a wheelchair comprises an upper side frame and a lower side frame. The upper and lower side frames are connected together by first and second connections. The first and second connections are each structured to be axially and pivotally displaceable relative to the upper and lower side frames to permit the elevation and angle of the upper side frame relative to the lower side frame to be adjusted.

11 Claims, 4 Drawing Sheets

ADJUSTABLE SIDE FRAME AND WHEELCHAIR WITH ADJUSTABLE SIDE FRAME

BACKGROUND

Wheelchairs are well known forms of transportation that increase the mobility of the physically impaired. Wheelchairs are typically relatively small, single-person conveyances that generally comprise a seat supported by a frame which, in turn, is supported by two oppositely disposed drive wheels and front casters.

In order to meet the needs of the physically impaired, wheelchairs should be easily and readily adapted to fit the profile of various wheelchair occupants. Moreover, it is often preferable that wheelchairs accommodate component parts unique to the wheelchair occupant. While meeting the needs of the physically impaired, wheelchairs must continue to accommodate both ambulatory and recreational travel.

Conventional wheelchairs are typically custom-built to address the needs of the wheelchair occupant. However, custom-built wheelchairs are generally costly. Moreover, ordering and custom building a wheelchair commonly results in an undue delay in delivering the wheelchair to the wheelchair occupant.

Adjustable wheelchairs are an alternative to custom-built wheelchairs. Adjustable wheelchairs typically include side frames having various frame tubes that are in part adjustably connected together. Adjustable connections may come in the form of slidable and pivotally displaceable connections. Such connections are often limited in their application and frequently require adjustments to multiple components where an adjustment to a single component will accomplish the desired result.

A need exists for a wheelchair that is easily adaptable to suit the needs of a wheelchair occupant without imposing an undue delay in the delivery of the wheelchair on the wheelchair occupant. A simple yet dependable, low-cost alternative to the more costly conventional custom-built wheelchairs is desired.

SUMMARY

The invention is directed to an adjustable side frame that satisfies the foregoing as well as other needs. An adjustable side frame for a wheelchair comprises an upper side frame and a lower side frame. The upper and lower side frames are connected together by first and second connections. The first and second connections are each structured to be axially and pivotally displaceable relative to the upper and lower side frames to permit the elevation and angle of the upper side frame relative to the lower side frame to be adjusted. The invention is also directed to a wheelchair in combination with the adjustable side frame.

Various objects and advantages of this invention will become apparent to those skilled in the art from the following detailed description of the preferred embodiment, when read in light of the accompanying drawings.

DESCRIPTION

Figure 1:
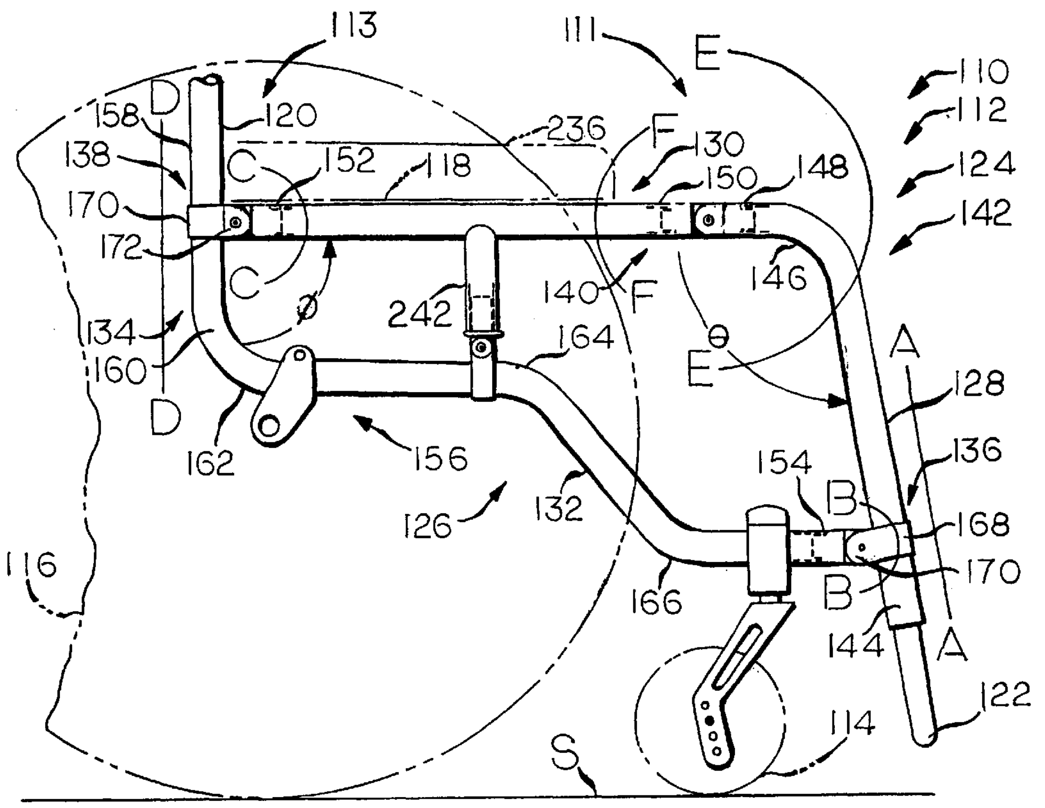
FIG. 1 is a partial side elevational view of a manual wheelchair having an adjustable side frame according to the invention, and wherein a seat panel, a rear drive wheel and a front caster are schematically represented at least in part in phantom lines and the inside of the adjustable side frame and connection plugs are shown at least in part in hidden lines.

Referring now to the drawings, there is illustrated in

FIG. 1 a wheelchair 110 comprising a pair of laterally spaced side frames 112 (only one side frame 112 is shown). The side frames 112 are supported on a supporting surface S by front wheels or casters 114 and rear drive wheels 116. A laterally extending seat panel 118 and seat back 120 are supported between the side frames 12. The side frames 121 can further support opposing armrests (not shown) and footrests 122.

The present invention is an adjustable side frame 112 comprising an upper side frame 124 and a lower side frame 126. The upper side frame 124 comprises a front frame tube 128 and an upper frame tube or seat tube 130. The lower side frame 126 comprises a lower frame tube 132 and a rear frame tube 134.

The upper side frame 124 and the lower side frame 126 are connected together by a front connection 136 and a rear connection 138. An intermediate connection 140 can form a part of the upper side frame 124. The intermediate connection 140 can be located between the front frame tube 128 and the seat tube 130.

The upper side frame 124 is preferably L-shaped in construction. The front frame tube 128 shown comprises an upper portion, generally indicated at 142, and a lower end 144. An elbow 146 generally defines the upper portion 142. The elbow 146 has a rear end 148. The seat tube 130 comprises a front end 150 and a rear end 152. The rear end 148 of the elbow 146 can be connected to the front end 150 of the seat tube 128 by the intermediate connection 140.

The lower frame tube 132 of the lower side frame 126 shown comprises a front end 154 and a rear portion 156. The rear frame tube 134 comprises an upper end 158 and a lower portion 160. The rear portion 156 of the lower frame tube 132 shown is connected to the lower portion 160 of the rear frame tube 134 by an elbow 162. Although the lower frame tube 132 shown is provided with a plurality of offsets 164 and 166 and thus, is non-linear in shape, it should be understood that the lower frame tube 132 can be substantially straight or linear in shape or can have any other suitable shape.

The front end 154 of the lower frame tube 132 of the lower side frame 126 is connected to the front frame tube 128 of the upper side frame 124 by the front connection 136. The rear end 152 of the seat tube 130 of the upper side frame 124 is connected to the rear frame tube 134 of the lower side frame 126 by the rear connection 138.

According to one embodiment of the invention, the front connection 136 can have a front portion 168 that is axially or substantially vertically displaceable relative to the front frame tube 128 along the line A—A and a rear portion 170 that is pivotally displaceable relative to the front frame tube 128 along the line B—B. The rear connection 138 similarly can have a front portion 172 that is pivotally displaceable relative to the rear frame tube 134 along the line C—C and a rear portion 170 that is axially or substantially vertically displaceable relative to the rear frame tube 134 along the line D—D. The intermediate connection 140 enables the front frame tube 128 to be pivotally displaceable with respect to the seat tube 130 along the lines E—E and F—F.

Figure 2:
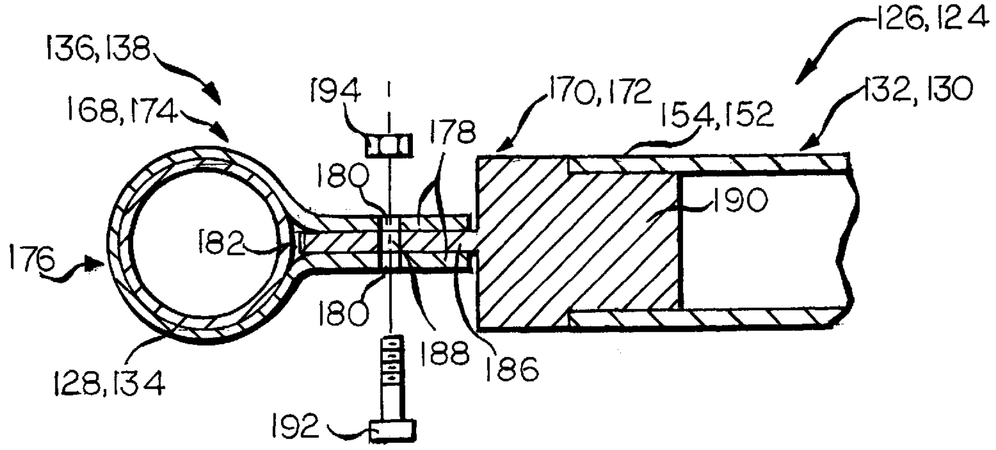
FIG. 2 is an enlarged partially exploded top plan view of a connection for use with the adjustable side frame shown in FIG. 1.

As shown in FIG. 2, the front portion 168 of the front connection 136 and the rear portion 170 of the rear connection 138 each can be comprised of a slidable member, such as the tube clamp 176 shown, which is slidably engageable with the front and rear tubes 128 and 134 (shown in FIG. 1), respectively. The tube clamp 176 can have radially extending tabs 178 with a hole 180 in each tab 178. The tabs 178 can be spaced apart so as to form a yoke 182 between the tabs 178.

The rear portion 170 of the front connection 136 and the front portion 172 of the rear connection 138 each can include a tongue 186 and a hole 188 through the tongue 186. A plug 190 can extend axially or longitudinally from the tongue 186. The term "longitudinal" is understood to mean from front to back of the wheelchair 110. The plug 190 of the front connection 136 can be insertable into the front end 154 of the lower frame tube 132 of the lower side frame 126 (shown in FIG. 1). Likewise, the plug 190 of the rear connection 138 can be insertable into the rear end 152 of the seat tube 130 of the upper side frame 124.

The tongue 186 of each connection 136 and 138 is insertable into one of the respective yokes 182. With the holes 180 and 188 in the tongue 186 and tabs 178 coaligned, a fastener, such as the hex cap screw 192 shown, can be inserted into and through the holes 180 and 188. A lock nut 194 can threadably engage the hex cap screw 192. The tube clamp 176 can be tightly clamped about the front frame tube 128 and the rear frame tube 134 by tightening the lock nut 194 tightly onto the hex cap screw 192. Moreover, tightening the lock nut 194 onto the hex cap screw 192 tightens the tongue 186 in the yoke 182 formed between the tabs 178.

By loosening the lock nut 194 of the front and rear connections 136 and 138, the front and rear connections 136 and 138 can be axially displaced respectively along the lines A—A and D—D (shown in FIG. 1) to correspondingly raise and lower the upper side frame 124 relative to the lower side frame 126. Moreover, the tongue 186 of the front and rear connections 136 and 138 can be pivotally displaced respectively along the lines B—B and C—C (also shown in FIG. 1) relative to the yoke 182 of each connection 136 and 138 by loosening the lock nut 194 to permit the angle $\phi$ of the seat tube 130 (shown in FIG. 1) to be adjusted relative to the rear frame tube 134.

Figure 8:
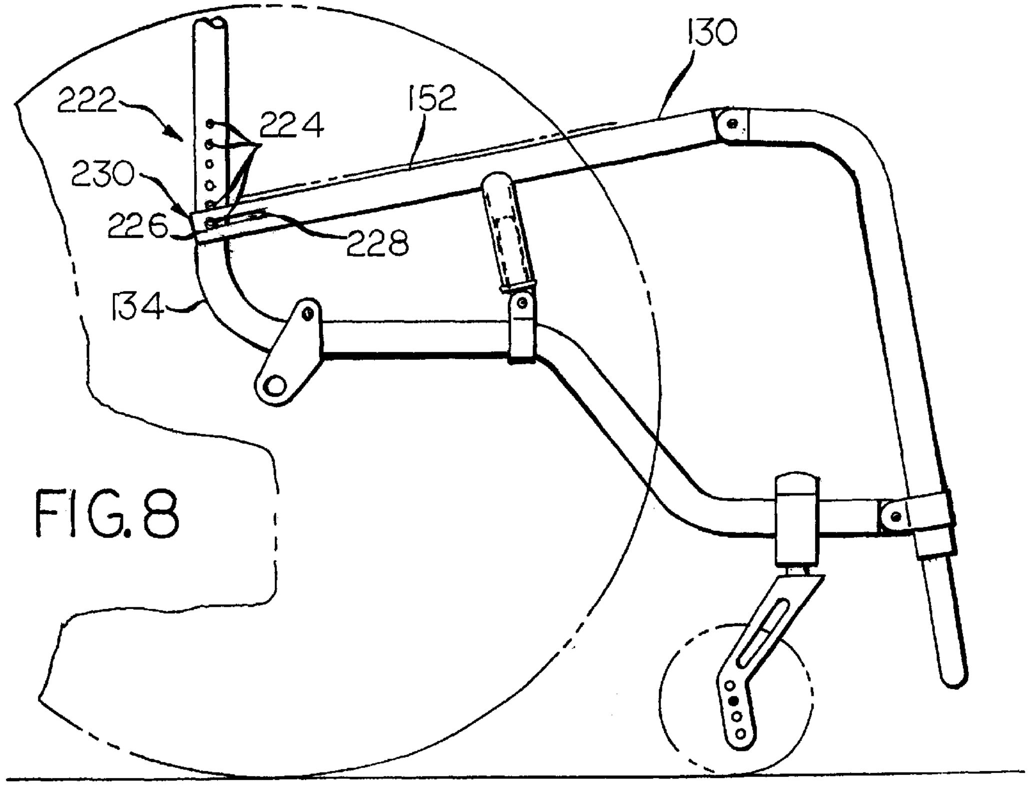
FIG. 8 is a partial side elevational view and a partial schematic representation of a manual wheelchair having an adjustable side frame with an alternative connection, wherein the adjustable side frame is adjusted to tilt the wheelchair seat rearward.

An alternative connection 222 is shown in FIG. 8. This connection 222 comprises vertically spaced index holes 224 in the rear frame tube 134. A pair of laterally spaced tabs 226 (only one of which is shown) extends from the rear end 152 of the seat tube 130. The tabs 226 are provided with longitudinally extending slots 228. A yoke 230 is formed between the tabs 226. The yoke 230 is dimensioned and configured to receive the frame tube 134 in such a manner that the slots 228 in the tabs 226 coalign with desired index holes 224 in the frame tube 134. When the slots 228 are aligned with the desired index holes 224, a fastener (not shown) can be used to connect the frame tube 134 in the yoke 230 between the tabs 226, and thus, releasably connect the seat tube 130 to the rear frame tube 134. It should be understood that a similar connection could be substituted in the place of the front connection 136. In an alternative embodiment to that shown in FIG. 8, alternate versions of the tabs 266, not shown, could be formed to wrap fully around the rear frame tube 134. In such a case, the rear end 152 of the upper frame tube 130 could be formed with a horizontal slot, not shown, to accommodate the need for horizontal displacement as the rear connection 138 moves vertically up or down.

Another connection 322 is shown in FIG. 9. This connection 322 comprises a channel 324, 326 at the interface between the seat tube 130 and the rear frame tube 134 and at the interface between the front frame tube 128 and the lower frame tube 132. The channel 324, 326 would preferably be located on the rear frame tube 134 and the front frame tube 128, as shown in the drawings. Axial displacement of the rear frame tube 134 and the front frame tube 128 would be accomplished by a fastener or lock, such as an internal locking sleeve or set screws. A pivot joint 328, 330 would accommodate angular displacement of the seat tube 130 and the lower frame tube 132.

Figure 3:
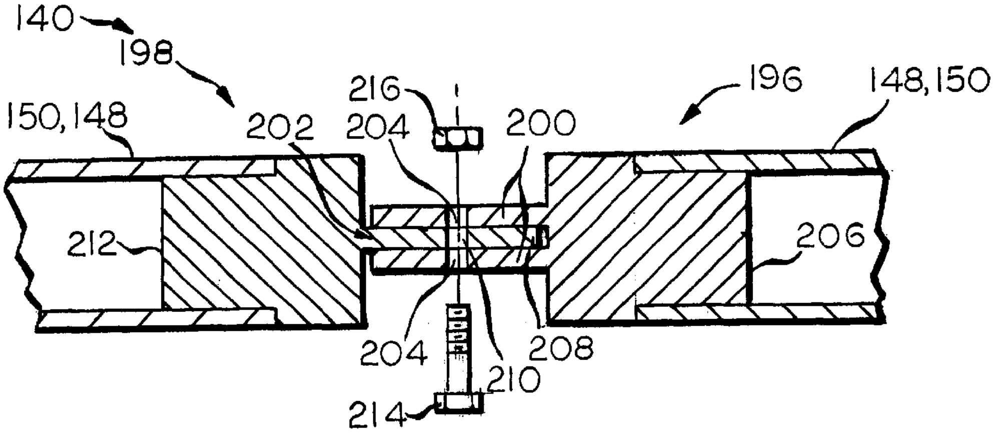
FIG. 3 is an enlarged partially exploded top plan view of another connection for use with the adjustable side frame shown in FIG. 1.

The intermediate connection 140, as shown in FIG. 3, is comprised of a first portion 196 and a second portion 198. The first portion 196 can be comprised of a pair of spaced tabs 200 forming a yoke 202 between the tabs 200. The tabs 200 can be provided with coaligning holes 204. The tabs 200 can extend axially from a plug 206. The plug 206 can be insertable into a frame tube, such as the rear end 148 of the elbow 146 (shown in FIG. 1) of the front frame tube 128 (shown in FIG. 1) of the upper side frame 124 (shown in FIG. 1).

The second portion 198 of the intermediate connection 140 can be comprised of a tongue 208 having a hole 210 therein. The tongue 208 can extend axially from a plug 212. The plug 212 can be insertable into the front end 150 of the seat tube 130 (shown in FIG. 1) of the upper side frame 124 (shown in FIG. 1). The tongue 208 can be insertable into the yoke 202 formed between the tabs 200 of the first portion 196 of the intermediate connection 140. With the holes 204 and 210 coaligned, a fastener, such as the hex cap screw 214 shown, can be inserted into and through the coaligning holes 204 and 210. A lock nut 216 can be threadably engageable with the hex cap screw 214. By tightening the lock nut 216, the tongue 208 can be tightened in the yoke 202. By loosening the lock nut 216, the first and second portions 196 and 198 of the intermediate connection 140 can be pivotally displaced relative to one another along the lines E—E and F—F (shown in FIG. 1), to permit the angle $\theta$ of the front frame tube 128 and the seat tube 130 to be adjusted.

Alternatively, the plug 206 can be insertable into the front end 150 of the seat tube 130 (shown in FIG. 1). Alternatively, the plug 212 can be insertable into the rear end 148 of the elbow 146 (shown in FIG. 1) of the front frame tube 128 (shown in FIG. 1) of the upper side fame 124 (shown in FIG. 1).

Figure 4:
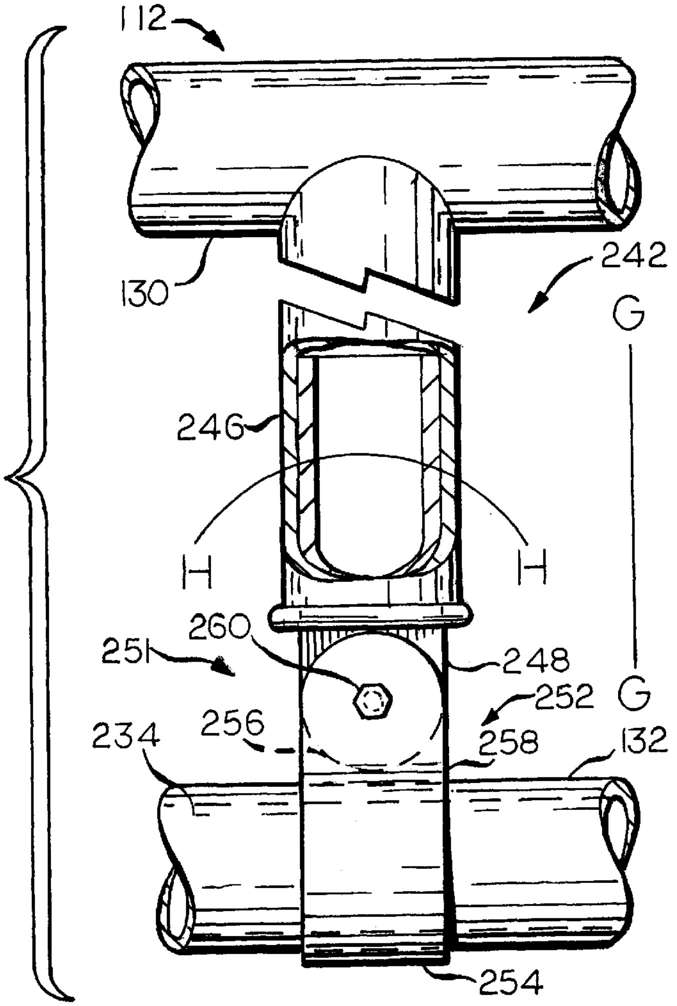
FIG. 4 is an enlarged partially cutaway side elevational view of a telescopic lateral support assembly for use with the adjustable side frame shown in FIG. 1, and wherein an outer tube of the telescopic lateral support assembly is shown broken to represent an indeterminate length and a saddle washer is shown in hidden lines.

As shown in FIG. 4, the present invention can include a telescopic lateral support assembly 242 for supporting a lateral strut (not shown) and interconnecting the seat tube 130 to the lower frame tube 132 to aid in supporting the side frames 112. The telescopic lateral support assembly 242 can include an outer tube 246 and an inner tube 248, which are slidably engageable with one another. The outer tube 246 and the inner tube 248 can be vertically supported by the side frames 112, such as between the upper frame tube 130 and the lower frame tube 132, as shown. The telescopic lateral support assembly 242 shown is expandable and collapsible along the lines G—G to permit displacement of the upper frame tune 130 relative to the lower frame tube 132.

The telescopic lateral support assembly 242 is preferably pivotally attached to at least one of the side frames 112, such as to the lower frame tube 132, as shown in the drawings, by a pivotal attachment 251. The pivotal attachment 251 can include a tube clamp 252 that includes a substantially U-shaped member 254. The U-shaped member 254 is preferably structured and dimensioned to receive the lower frame tube 132. Saddle washers 256 (shown in hidden line) can be provided between the legs 258 (only one of which is shown) of the U-shaped member 254 and the inner tube 248 of the telescopic lateral support assembly 242. Holes (shown in hidden line but not referenced) in the legs 258 of the U-shaped member 254, the saddle washers 256, and the inner tube 248 of the telescopic lateral support assembly 242 are adapted to coalign to receive a fastener 260. The fastener 260 can be loosened to permit the pivotal attachment 251 to pivot or can be tightened to prevent the pivotal attachment 251 from pivoting along the lines H—H.

In an alternate embodiment, not shown, the lateral support assembly 242 can be pivotally attached to the lower side frame 132 through connection to a slot, not shown, in the lower side frame 132 or in a block or bracket, both not shown, mounted onto the lower side frame 132. In yet another alternate embodiment, not shown, the lower end of the lateral support assembly could be comprised of a yoke or clamp, both not shown, for connection to the lower frame tube 132. The lower frame tube 132 could be adapted with a series of holes, not shown, for connection with the yoke or clamp.

In operation, a pair of side frames 112 (only one of which is shown) according to the invention are arranged so as to be laterally spaced. As illustrated in FIG. 1, the side frames 112 are supported on a supporting surface S by opposingly disposed front wheels or casters 114 and rear drive wheels 116. Note that the elevation of each rear drive wheel 116 is preferably substantially fixed, or releasably fixed, relative to a lower side frame 126. In this way, the lower side frame 126 is held in a substantially fixed position, or at a substantially fixed elevation, relative to the supporting surface S. Thus, the lower frame tube 132 and the rear frame tube 134 are held in a substantially fixed elevation relative to the supporting surface S.

The laterally spaced side frames 112 can support a seat panel 118 and a seat back 120. The seat panel 118 preferably, in turn, can support a seat cushion, such as the cushion 236 shown in FIG. 1, or the cushion 238 shown in FIG. 5. The side frames 112 of the present invention can be easily adjusted to adjust the elevation of the seat panel 118 to accommodate cushions of varying thickness or customize the height of the seat tube 130, as will become more apparent in the description that follows.

Figure 5:
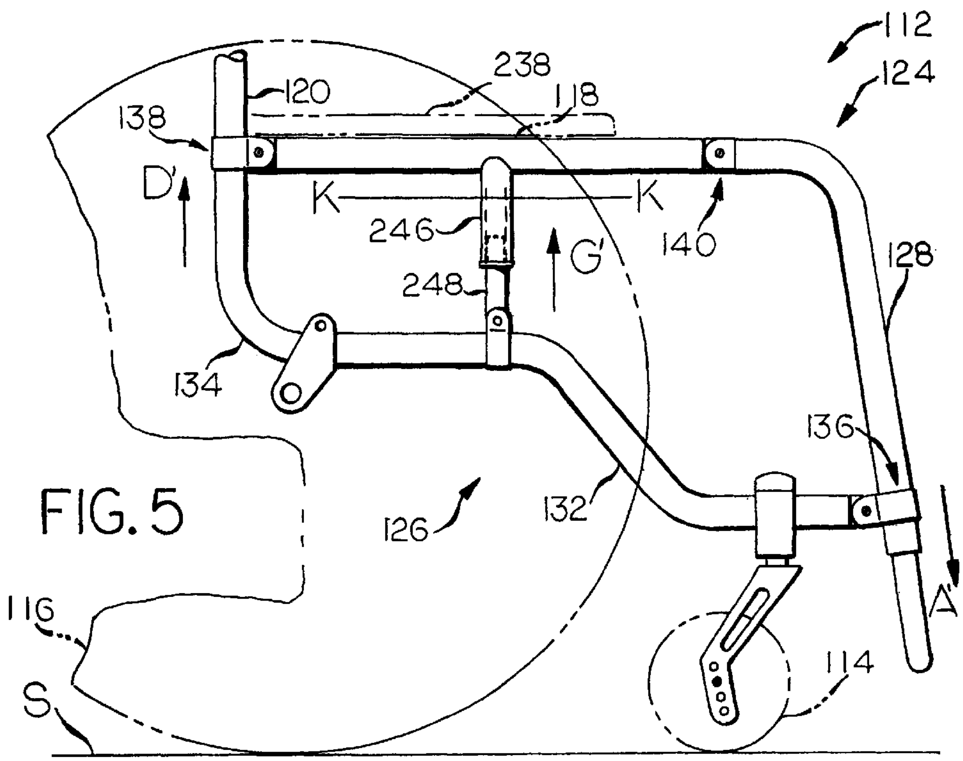
FIG. 5 is a side elevational view of the adjustable side frame shown in FIG. 1 adjusted to raise the elevation of the wheelchair seat from the position shown in FIG. 1.

The side frame 112 can be independently adjusted at each of the connections 136, 138 and 140 and 251. As shown in FIG. 5, the elevation of the seat panel 118 can be raised, such as from the position shown in FIG. 1, by sliding the front connection 136 downward in the direction of the arrow A' relative to the front frame tube 128 of the upper side frame 124, and by sliding the rear connection 138 upward in the direction of the arrow D' relative to the rear frame tube 134 of the lower side frame 126. Similarly, the outer tube 246 can be raised upward in the direction of the arrow G' relative to the inner tube 248. Conversely, the elevation of the seat panel 118 can be lowered back to the position shown in FIG. 1 by sliding the front connection 136 upward relative to the front frame tube 128 of the upper side frame 124 and the rear connection 138 downward relative to the rear frame tube 134 of the lower side frame 126. Similarly, the outer tube 246 can be lowered downward relative to the inner tube 248.

Figure 6:
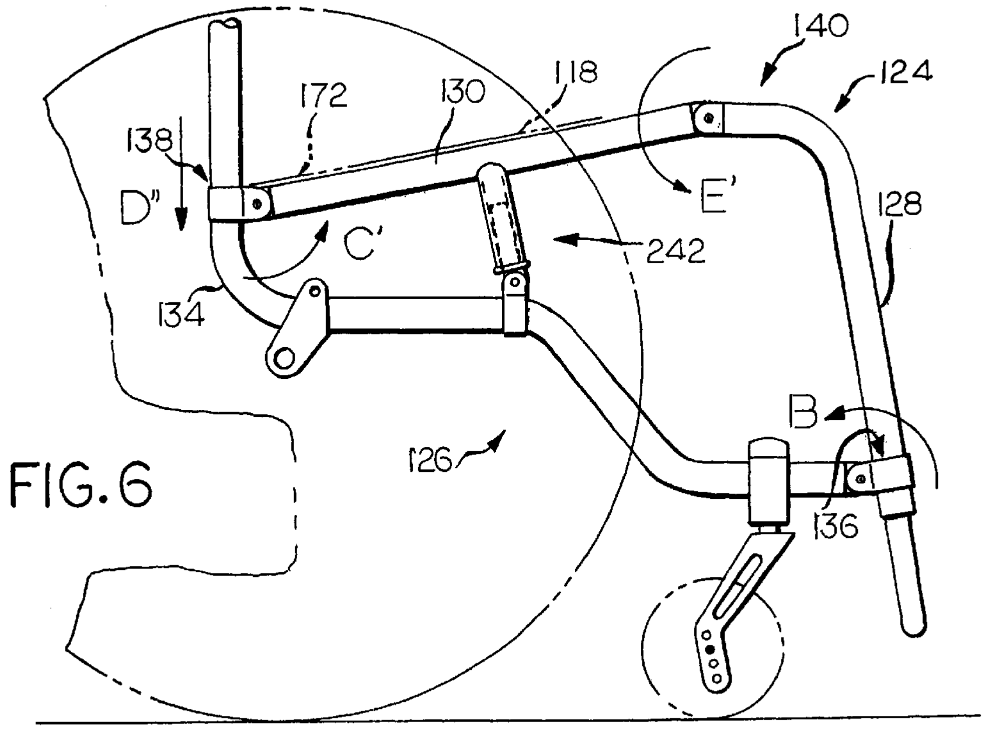
FIG. 6 is a side elevational view of the adjustable side frame shown in FIG. 11 adjusted to tilt the wheelchair seat rearward.

As shown in FIG. 6, the rear end 172 of the seat panel 118 can be lowered or tilted back by sliding the rear connection 138 downward in the direction of the arrow D" relative to the rear frame tube 134 and pivotally displacing the front frame tube 128 in the direction of the arrow B' relative to the lower side frame 126 and the seat tube 130 in the direction of the arrow C' relative to the rear frame tube 134. Conversely, the front end 218 of the seat panel 118 can be raised to tilt the seat panel 118 (or the seat tube 130) rearward or back by sliding the front frame tube 128 upward relative to the front connection 136 and pivotally displacing the front frame tube 128 relative to the lower side frame 126 and the seat tube 130 relative to the rear frame tube 134. Note the telescopic lateral support assembly 242 is permitted to expand and contract as well as pivot as the upper side frame 124 is displaced relative to the lower side frame 126.

Alternatively, by lowering the rear connection 138 in the direction of the arrow D" and pivotally displacing the seat tube 130 in the direction of the arrow C' at the rear connection 138 and in the direction of the arrow E' at the intermediate connection 140, the seat tube 130 can be tilted rearward. This adjustment can be accomplished without substantially varying the elevation of the footrests 122. Conversely, the rear connection 138 can be raised relative to the rear frame tube 134 and the seat tube 130 can be pivotally displaced in a direction opposite to the arrow E' relative to the front frame tube 128 at the intermediate connection 140 to tilt the seat tube 130 forward.

It should be understood that, where an intermediate connection 140 is provided, the front connection 136 could be a rigid connection, such as a welded connection (not shown). When a rigid front connection 136 is employed, the vertical displacement of the rear connection 138 may be limited. To increase the vertical displacement of the rear connection 138, it may be desirable to shift the seat tube 130 longitudinally along the line K—K (shown in FIG. 5). This may be accomplished by allowing the fasteners 192 and 214 to fit loosely in the holes 180, 188, 204 and 210 through which the fasteners 192 and 214 are inserted.

Figure 7:
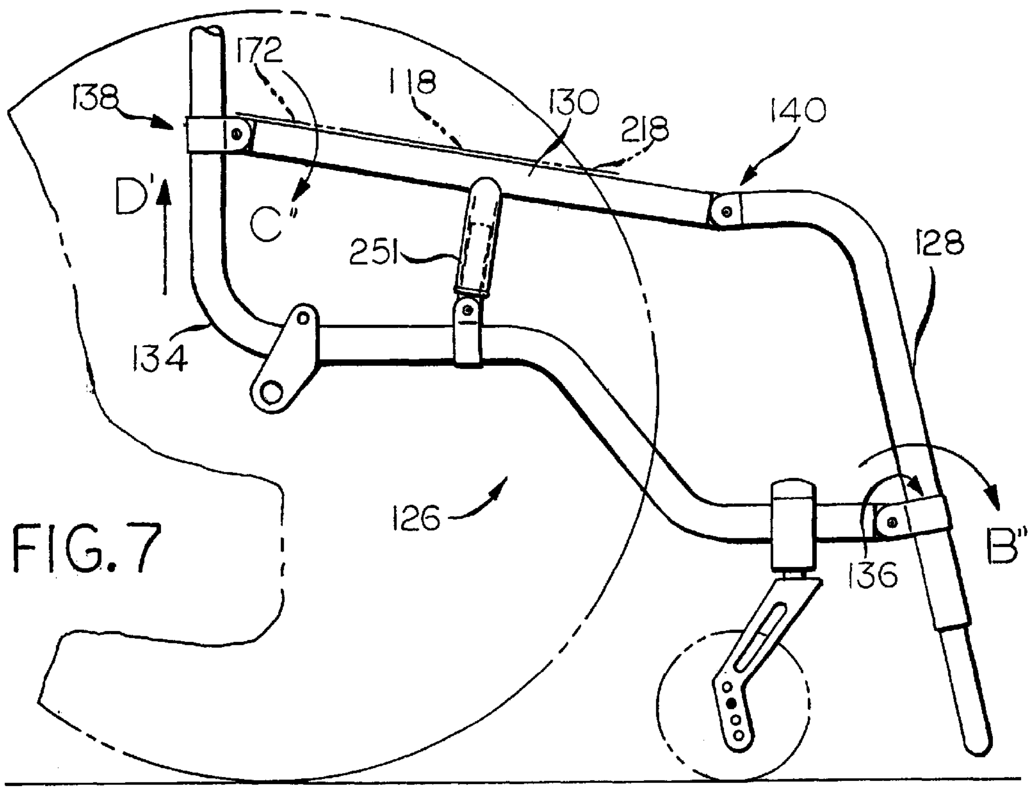
FIG. 7 is a reduced scale side elevational view of the adjustable side frame adjusted to tilt the wheelchair seat forward.

As shown in FIG. 7, the rear end 172 of the seat panel 118 can be raised or tilted forward by sliding the rear connection 138 upward in the direction of the arrow D' relative to the rear frame tube 134 and pivotally displacing the front frame tube 128 in the direction of the arrow B" relative to the lower side frame 126, and the seat tube 130 in the direction of the arrow C" relative to the rear frame tube 134. Conversely, the front end 218 of the seat panel 118 can be lowered or tilted forward by sliding the front frame tube 128 downward relative to the front connection 136 and pivotally displacing the front frame tube 128 relative to the lower side frame 126 and the seat tube 130 relative to the rear frame tube 134.

The alternative connection 222 illustrated in FIG. 8 can be adjusted by removing a fastener (not shown) and by positioning the yoke 230 about the frame tube 134 with the slots 228 in the tabs 226 coaligning with desired index holes 224 in the frame tube 134.

It should be understood that an adjustable side frame according to the invention could include a first connection and a second connection. At least one of the connections should be axially displaceable relative to a portion of the side frame 112 to permit the elevation of the opposing front or rear ends 111 and 113 (generally indicated in FIG. 1) of the upper side frame 124 to be adjusted. This, in turn, permits the elevation of the front and rear ends 218 or 172 of the seat panel 118 to be adjusted. The other connection should be pivotally displaceable to permit the angle between the upper side frame 124 and a lower side frame 126 to be adjusted. Either the front or rear connections 136, 138 can be axially displaceable with respect to a portion of the side frame 112, so long as at least one of these connections 136 or 138 is axially displaceable. Obviously, if the front or rear connections 136, 138 are axially displaceable, the elevation of the front and rear ends 111 and 113 (generally indicated in FIG. 1) of the upper side frame 124 can be adjusted. If only the rear connection 138 is axially displaceable, either the front or intermediate connection 136 or 140 can be pivotally displaceable. However, if only the front connection 136 is axially displaceable, the rear connection 138 should be pivotally displaceable.

If desired, a third connection can be provided. In this embodiment, the first and second connections, namely, the front connection 136 and the rear connection 138, can be axially and pivotally displaceable relative to a portion of the side frame 112. This permits the elevation of the front and rear ends 111 and 113 (generally indicated in FIG. 1) of the upper side frame 124 to be adjusted. This, in turn, permits the elevation of the front and rear ends 218 and 172 of the seat panel 118 to be adjusted. The third connection, namely, the intermediate connection 140, permits the elevation of the rear end 172 of the seat panel 118 to be adjusted without adjusting the elevation of the footrests 122.

It should be understood that the sliding connection (that is, the tube clamp 176) and the incrementally adjustable connection (formed by the cooperative engagement of the yoke 230 and a portion of the side frame 112) are described for illustrative purposes. Other forms of connections may be used which permit the elevation of portions of the side frame 112 to be adjusted relative to other portions of the side frame 112. Moreover, other pivotally displaceable connections may be used. For example, portions of the side frame 112 may bend.

Another connection between the frame parts, such as the upper frame tube 130 and the rear frame tube 134, is to have a channel, not shown, at the interface of the two tubes. The channel could be located on the vertical tube member, is the rear frame tube 134, and the rear end 152 could be adapted to be slidably engaged within the channel. The rear end 152 could be locked in place to fix the vertical position within the channel by an expandable internal locking sleeve, not shown, by set screws, not shown, or by any other means. The pivot joint of the existing connections would accommodate the angular displacement.

In accordance with the provisions of the patent statutes, the principle and mode of operation of this invention have been explained and illustrated in its preferred embodiment. However, it must be understood that this invention can be practiced otherwise than as specifically explained and illustrated without departing from its spirit or scope.

What is claimed is:

1. An adjustable side frame for a wheelchair, said side frame comprising:

a seat tube having a front end and a rear end;

a front frame tube having an upper portion and a lower end;

a lower side frame having a lower frame tube and a rear frame tube;

a first connection connecting said rear end of said seat tube to said rear frame tube, said first connection being axially displaceable relative to said rear frame tube;

a second connection at said front end of said seat tube, said second connection being pivotally displaceable, said upper portion of said front frame tube being connected to said front end of said seat tube by said second connection;

a third connection, said lower end of said front frame tube being connected to a front end of said lower frame tube by said third connection; and a telescopic assembly supported between said seat tube and said lower frame tube, said telescopic assembly being expandable and contractible between said seat tube and said lower frame tube as said seat tube is displaced relative to said lower frame tube.

2. The adjustable side frame of claim 1, wherein said third connection includes means for making said third connection pivotally displaceable.

3. The adjustable side frame of claim 1, wherein said third connection includes means for making said third connection slideably displaceable relative to said lower frame tube.

4. The adjustable side frame of claim 1, wherein said third connection includes a tube clamp which is slideably engageable with said front frame tube.

5. The adjustable side frame of claim 4, wherein said tube clamp includes tabs which are spaced apart to form a yoke, said third connection further including a tongue having a plug extending therefrom, said plug being insertable into said front end of said lower frame tube and said tongue being insertable in said yoke, said tube clamp being adapted to be tightened on said front frame tube and said tongue being adapted to be tightened in said yoke.

6. An adjustable side frame for a wheelchair, said side frame comprising:

a seat tube having a front end and a rear end;

a lower side frame having a lower frame tube and a rear frame tube;

a first connection connecting said rear end of said seat tube to said rear frame tube, said first connection being axially displaceable relative to said rear frame tube, said first connection including a tube clamp which is slideably engageable with said rear frame tube, said tube clamp including tabs which are spaced apart to form a yoke, said first connection further including a tongue having a plug extending therefrom, said plug being insertable into said rear end of said seat tube and said tongue being insertable into said yoke, said tube clamp being adapted to be tightened on said rear frame tube and said tongue being adapted to be tightened in said yoke;

a second connection at said front end of said seat tube, said second connection being pivotally displaceable; and a telescopic assembly supported between said seat tube and said lower frame tube, said telescopic assembly being expandable and contractible between said seat tube and said lower frame tube as said seat tube is displaced relative to said lower frame tube.

7. A wheelchair comprising:

a pair of laterally spaced side frames, each said side frame comprising:

an upper side frame including a seat tube and a front frame tube, said seat tube having a front end and a rear end, said front frame tube having an upper portion and a lower end;

a lower side frame including a lower frame tube and a rear frame tube, said lower frame tube having a front end;

a first connection connecting said rear end of said seat tube to said rear frame tube, said first connection being axially displaceable relative to said rear frame tube;

a second connection connecting said front end of said seat tube to said front frame tube, said second connection being pivotally displaceable; and a third connection connecting said lower end of said front frame tube to said front end of said lower frame tube, said third connection being axially displaceable; and a telescopic assembly supported between said seat tube and said lower frame tube, said telescopic assembly being expandable and contractible between said seat tube and said lower frame tube as said seat tube is displaced relative to said lower frame tube.

8. The wheelchair of claim 7, wherein said first connection includes a pivotal attachment to make said first connection pivotally displaceable.

9. The wheelchair of claim 7, wherein said telescopic assembly includes an outer tube and an inner tube which are slideably engageable with one another.

10. The wheelchair of claim 7, wherein said third connection includes a tube clamp and a tongue having a plug extending therefrom, said tube clamp being slideably engageable with said front frame tube, said tube clamp including tabs which are spaced apart to form a yoke, said plug being insertable into said front end of said lower frame tube, said tube clamp being adapted to be tightened on said front frame tube and said tongue being adapted to be tightened in said yoke.

11. The wheelchair of claim 7, wherein said first connection includes a tube clamp and a tongue having a plug extending therefrom, said tube clamp being slideably engageable with said rear frame tube, said tube clamp including tabs which are spaced apart to form a yoke, said plug being insertable into said rear end of said seat tube, said tube clamp being adapted to be tightened on said rear frame tube and said tongue being adapted to be tightened in said yoke.

* * * * *